(12) United States Patent
      Teyssier

(10) Patent No.:     US 12,559,226 B2
(45) Date of Patent:        Feb. 24, 2026

(54) ASSEMBLY FOR AN AIRCRAFT

(71) Applicant: Ratier-Figeac SAS, Figeac (FR)

(72) Inventor: Ghislain Teyssier, Brengues (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 18/774,127

(22) Filed: Jul. 16, 2024

(65) Prior Publication Data

US 2025/0033763 A1      Jan. 30, 2025

(30) Foreign Application Priority Data

Jul. 27, 2023     (EP) ..................................... 23306297

(51) Int. Cl.

| | |
|---|---|
| B64C 13/00 | (2006.01) |
| B64C 13/32 | (2006.01) |
| F16H 25/20 | (2006.01) |
| F16H 25/24 | (2006.01) |

(52) U.S. Cl.
CPC ........... B64C 13/32 (2013.01); F16H 25/205 (2013.01); F16H 25/2454 (2013.01); F16H 2025/2075 (2013.01)

(58) Field of Classification Search
CPC ................. B64C 13/32; F16H 25/2454; F16H 2025/2075
See application file for complete search history.

(56) References Cited

U.S. PATENT DOCUMENTS

| | | | | |
|---|---|---|---|---|
| 3,521,314 | A | * | 7/1970 | Steiner ...................... F16D 7/10 408/139 |
| 4,644,811 | A | * | 2/1987 | Tervo .................. F16H 25/2015 74/412 TA |
| 5,916,325 | A | * | 6/1999 | Madrid ...................... F16D 7/10 464/37 |
| 5,944,148 | A | * | 8/1999 | Bae .......................... B64C 13/34 188/134 |
| 8,291,782 | B1 | * | 10/2012 | Shaheen ............. F16H 25/2472 74/89.34 |

(Continued)

FOREIGN PATENT DOCUMENTS

| | | | | |
|---|---|---|---|---|
| CA | 2797985 A1 | * | 6/2013 | ............. B64C 13/28 |
| DE | 102007031974 A1 | * | 1/2009 | ......... F16H 25/2214 |

OTHER PUBLICATIONS

European Search Report for Application No. 23306297.5, mailed Dec. 7, 2023, 7 pages.

*Primary Examiner* — Zakaria Elahmadi

(74) *Attorney, Agent, or Firm* — CANTOR COLBURN LLP

(57)                    ABSTRACT

An assembly for maintaining the pitch angle of a flight control surface for an aircraft. The assembly includes a shaft comprising a screw thread and defining a shaft axis, and a nut. The nut includes a housing, a barrel located in the housing and comprising a screw thread for engaging with the screw thread of the shaft, and at least one locking element located in the housing. The housing comprises a radially inner cam surface adjacent to the locking element. The barrel is configured to rotate relative to the housing when the screw thread of the barrel is engaged and rotating with the screw thread of the shaft so as to move the locking element along the cam surface from a disengaged position in which the locking element is spaced from the screw thread of the shaft, to an engaged position.

16 Claims, 5 Drawing Sheets

(56) References Cited

U.S. PATENT DOCUMENTS

| | | | | |
|---|---|---|---|---|
| 8,714,479 | B1 * | 5/2014 | Chapman | B64C 13/341 |
| | | | | 244/99.3 |
| 8,844,389 | B2 * | 9/2014 | Kopecek | F16H 25/2015 |
| | | | | 244/102 R |
| 9,933,058 | B1 | 4/2018 | Muster | |
| 10,155,582 | B2 | 12/2018 | Medina et al. | |
| 10,801,594 | B2 | 10/2020 | Burgess | |
| 10,876,610 | B2 | 12/2020 | Fields et al. | |
| 11,287,019 | B2 | 3/2022 | Medina et al. | |
| 11,480,235 | B2 | 10/2022 | Ricard et al. | |
| 2002/0182006 | A1 | 12/2002 | Capewell et al. | |
| 2016/0281826 | A1 | 9/2016 | Medina et al. | |
| 2021/0062898 | A1 | 3/2021 | Medina et al. | |

* cited by examiner

ASSEMBLY FOR AN AIRCRAFT

CROSS-REFERENCE TO RELATED APPLICATIONS

This application claims the benefit of European Patent Application No. 23306297.5 filed Jul. 27, 2023, the disclosure of which is incorporated herein by reference in its entirety.

FIELD

The present disclosure relates an assembly for maintaining the pitch angle of a flight control surface and preferably of a trimmable horizontal stabiliser of an aircraft, and more particularly relates to a secondary nut for such an assembly.

BACKGROUND

Horizontal stabilisers are used on aircraft to maintain the longitudinal balance (or trim) of the aircraft in flight. Trimmable horizontal stabilisers allow the pitch angle of the horizontal stabilisers to be adjusted and are widely used in the aviation industry. They are effective at varying or maintaining the pitch angle of the aircraft during flight, and can aid in maintaining a stable flight altitude. Trimmable horizontal stabilisers also aid in reducing drag exerted by the tail section of an aircraft.

The pitch angle of a trimmable horizontal stabiliser can be adjusted using at least one actuator (known as a horizontal stabiliser trimmable actuator ("HSTA") or a trimmable horizontal stabiliser actuator ("THSA")). This actuator is located in the fuselage or body of the aircraft or in the tail section for a t-tail configuration. The actuator is part of a mechanism including a threaded shaft, which is disposed generally vertically, and a nut which is in engagement with the shaft and the trimmable horizontal stabiliser. Each trimmable horizontal stabiliser extends into the aircraft fuselage (for example through a slot in the fuselage) to attach to the nut of the actuator. The trimmable horizontal stabiliser may also be rotationally connected to the fuselage via a hinged connection. In operation, the actuator rotates the shaft which causes the nut to translate vertically along the shaft, thereby pivoting the trimmable horizontal stabiliser about the hinged connection to adjust the pitch angle of the trimmable horizontal stabiliser.

Since the horizontal stabiliser is integral to maintaining the balance of the aircraft, it is important that in the event of failure of a primary load path (provided by a primary nut), there is still a structural link provided between the shaft and the trimmable horizontal stabiliser. This structural link can be provided by a secondary nut (providing a secondary load path), which engages with the shaft in the event of failure of the primary load path, for example in the event that the primary nut breaks.

In known arrangements, the secondary nut can be engaged with or locked onto the shaft by generating a friction torque between the threads of the nut and the threads of the screw shaft (for example using a pliers mechanism). In such arrangements, the friction torque is dependent on factors such as the axial loading applied on the nut by the horizontal stabiliser, which is dependent on external forces applied to the horizontal stabiliser, and may rely on other components to apply a frictional force for example a spring box. Such an arrangement relies on a certain amount of loading being applied to the horizontal stabiliser in order to trigger the locking mechanism and to counteract the driving motor torque. This can be problematic when the actuator is not significantly loaded, for example during cruise. Other known arrangements rely on sensors to sense when a primary load path has failed to trigger engagement of the secondary nut to the shaft. However, such arrangements are complex and rely on proper functioning of the computer system and sensors involved.

The present invention aims to improve the mechanism by which the secondary nut is engaged to the shaft so that it is more reliable and less reliant on aerodynamic loads applied to the horizontal stabiliser. It is further noted that although the invention is presented in association with a trimmable horizontal stabiliser, it may be used in association with other control surfaces, for instance aircraft flaps or slats.

SUMMARY

According to an aspect of the invention, there is provided an assembly for maintaining the pitch angle of a flight control surface for an aircraft, the flight control surface preferably being a trimmable horizontal stabiliser, the assembly comprising a shaft comprising a screw thread and defining a shaft axis, and a nut comprising a housing, a barrel located in the housing and comprising a screw thread for engaging with the screw thread of the shaft, and at least one locking element located in the housing, wherein the housing comprises a radially inner cam surface adjacent to the locking element, and the barrel is configured to rotate relative to the housing when the screw thread of the barrel is engaged and rotating with the screw thread of the shaft so as to move the locking element along the cam surface from a disengaged position in which the locking element is spaced from the screw thread of the shaft, to an engaged position in which the locking element is wedged between the screw thread of the shaft and the housing thereby preventing relative rotation between the shaft and the housing and optionally increasing the driving torque to a level sufficient to stall an actuator configured to rotate the shaft. Such a nut provides a locking mechanism which is more reliable than known arrangements. This is at least in part because operation of the locking mechanism is dependent on the torque applied by the actuator, rather than forces applied by the flight control surface. The locking mechanism is particularly secure because the frictional force locking the nut in place increases as the torque applied by the actuator increases (even if the aerodynamic forces applied to the flight control surface are minimal). The locking mechanism is also completely mechanical and is not dependent on any sensors or action by the pilot or computer system of the aircraft, further improving its reliability.

According to a further aspect of the invention, there is provided a nut for maintaining the pitch angle of a flight control surface (and preferably a trimmable horizontal stabiliser) of an aircraft, the nut comprising a housing, a barrel located in the housing, the barrel having a screw thread, and a locking element, wherein the locking element is configured to move from a disengaged position to an engaged position when the screw thread of the barrel is brought in engagement with the screw thread of the shaft, wherein in the engaged position the locking element is wedged between the screw thread of the shaft and the housing.

According to a further aspect of the invention, there is provided an assembly for maintaining the pitch angle of a flight control surface, the flight control surface preferably being a trimmable horizontal stabiliser, the assembly comprising a shaft comprising a screw thread and defining a shaft axis, and a nut, the nut comprising a housing wherein the nut housing is configured to be connected to the flight control surface, for instance through a gimbal joint, a barrel located in the housing and comprising a screw thread for engaging with the screw thread of the shaft, and at least one locking element located in the housing, wherein the housing comprises a radially inner cam surface adjacent to the locking element, and the barrel is configured to rotate relative to the housing when the screw thread of the barrel is engaged and rotating with the screw thread of the shaft so as to move the locking element along the cam surface from a disengaged position in which the locking element is spaced from the screw thread of the shaft, to an engaged position in which the locking element is wedged between the screw thread of the shaft and the housing thereby preventing relative rotation between the shaft and the housing and optionally increasing the driving torque to a level sufficient to stall the actuator. The actuator may be configured to rotate the shaft. Such a nut provides a locking mechanism which is more reliable than known arrangements. This is at least in part because operation of the locking mechanism is dependent on the torque applied by the actuator, rather than forces applied by the flight control surface. The locking mechanism is particularly secure because the frictional force locking the nut in place increases as the torque applied by the actuator increases (even if the aerodynamic forces applied to the flight control surface are minimal). The locking mechanism is also completely mechanical and is not dependent on any sensors or action by the pilot or computer system of the aircraft, further improving its reliability.

A shaft base comprising a non-rotating part of the actuator may be configured to be connected to the fuselage, for instance through a gimbal joint, such that when the shaft is rotated relative to the nut, the nut moves vertically relative to the fuselage to change the pitch angle of the flight control surface.

The following optional features may be applied to any of the above aspects:

The barrel may comprise at least one radial opening, and the opening may be in the form of at least one slot. The at least one locking element may be located in the at least one radial opening. The slot may be configured to allow the locking element to translate radially relative to the barrel from the disengaged to the engaged position such that the locking element is driven in rotation by the barrel when the barrel rotates. This provides robust and reliable means for transferring movement between the barrel to the at least one locking element.

The cam surface may comprise an indentation formed in a radially inner surface of the housing adjacent to the locking element such that the roller is forced radially inwards towards the screw thread of the shaft as the barrel rotates relative to the housing.

The indentation may be formed by a concavity. The specific shape of the indentation may vary and may be optimised to ensure a self-locking function as explained below. This provides simple and effective means for causing the locking element to move to the engaged position in a controlled manner.

The indentation may comprise three concavities, a central of the concavities being deeper than two adjacent concavities. This particular shape is advantageous because the nut can remain locked when the torque applied by the actuator is released. This feature can also be useful to reduce the risk of flutter when operating because any free play between the nut and the shaft can be cancelled by this feature.

The locking element may be a roller. This allows the locking element to easily roll along the cam surface. The roller means that the locking element will move in a particular direction when it rotates, allowing it to effectively translate along the cam surface.

The assembly may further comprise at least one biasing member configured to bias the locking element towards the cam surface. This helps to ensure that the locking element will effectively travel along the cam surface during a locking step, and also helps to avoid contact between the at least one locking element and the screw thread of the shaft when the screw thread of the barrel is disengaged from the screw thread of the shaft (i.e. outside of a locking step). This helps to avoid unnecessary wear of the at least one locking element.

The assembly may further comprise a plurality of locking elements distributed circumferentially about the barrel. The plurality of locking elements may comprise two rows of locking elements. The at least one biasing member may be in engagement with consecutive locking elements. The plurality of locking elements contribute towards providing an assembly which is robust and reliable even under high load conditions, because the plurality of locking elements will distribute the torque applied over a larger surface area.

The at least one biasing member may comprise a leaf spring. A leaf spring is particularly suited to this purpose, because it is simple to produce and will be effective at maintaining a constant distance between the locking elements, in order to bias the locking elements out towards the cam surface. The leaf springs are also simple to produce and to assemble between the locking elements.

The screw thread of the barrel may be an ACME thread.

The assembly may comprise at least one bearing located axially between the barrel and the housing. In such an arrangement, an axial end of the barrel may comprise a series of blind holes, the at least one bearing (for example a ball bearing) being provided in a respective blind hole. The assembly may preferably comprise at least two axial bearings, each axial bearing located at opposite axial sides of the barrel.

The cam surface may be shaped such that the locking element can move from the disengaged to the engaged position with rotation of the barrel in two opposite directions of rotation. This allows the nut to be effective regardless of the direction of torque applied to the shaft by the actuator. This negates the needs for more than one secondary nut in the assembly.

According to a further aspect of the invention, there is provided an assembly for changing and maintaining the pitch angle of a flight control surface for an aircraft, the assembly comprising the assembly for maintaining the pitch angle of a flight control surface for an aircraft according to any of the above, wherein the nut is a secondary nut, and the assembly comprising a primary nut engaged with the screw thread of the shaft and an actuator configured to rotate the shaft or the primary nut such that the shaft and the nut translate relatively to each other upon rotation of the actuator, and the secondary nut being configured to engage with the shaft of the assembly when the primary nut fails.

BRIEF DESCRIPTION OF THE DRAWINGS

Various embodiments will now be described, by way of example only, and with reference to the accompanying drawings in which.

DETAILED DESCRIPTION

Figure 1:
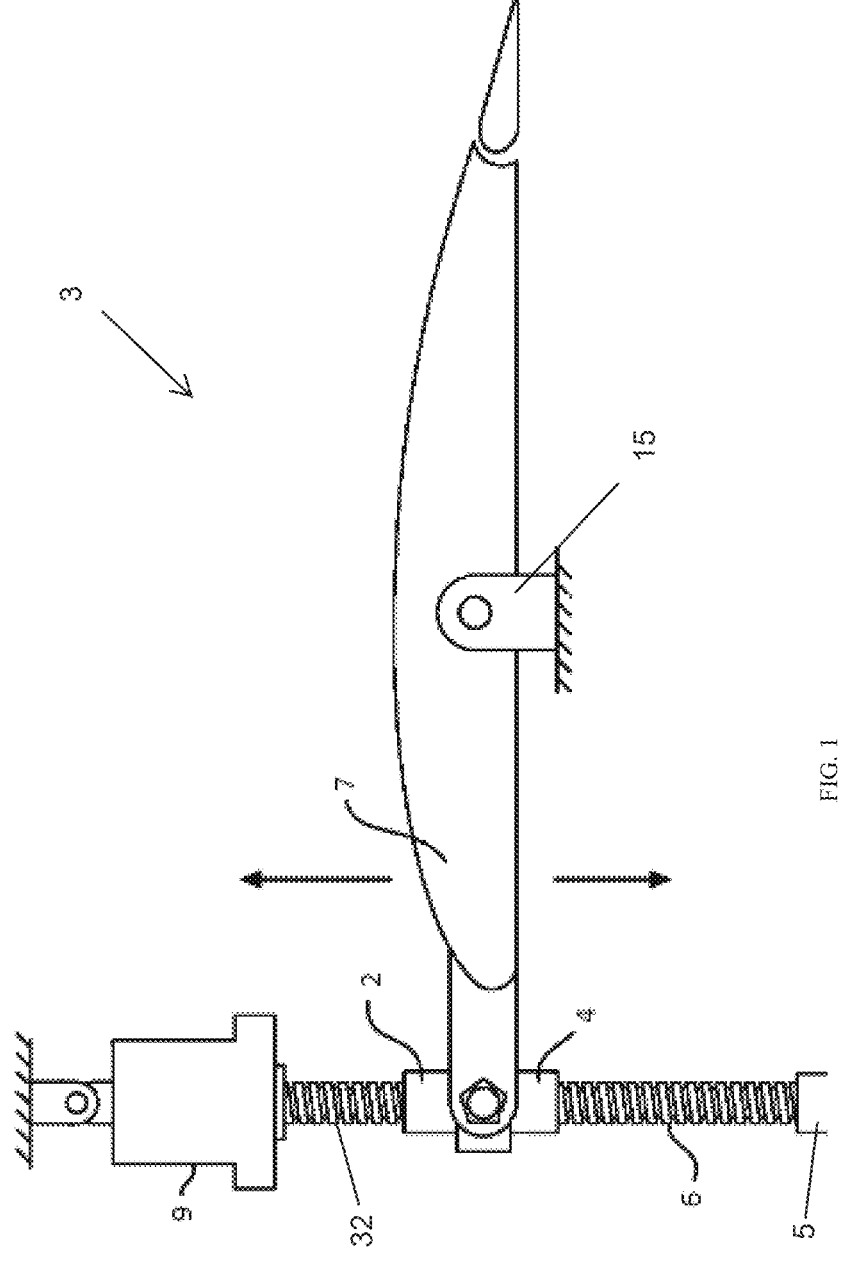
FIG. 1 shows a schematic view of an assembly for changing and maintaining the pitch angle of a trimmable horizontal stabilizer when installed on aircraft.

Referring first to FIG. 1, an assembly 3 for changing and maintaining the pitch angle of a trimmable horizontal stabiliser 7 of an aircraft is shown. The assembly 3 includes a shaft 6, a primary nut 4, preferably a ball nut, and a secondary nut 2. The primary nut 4 comprises screw thread (not shown) which is in engagement with a screw thread 32 of the shaft 6, preferably via a plurality of ball members (not shown). The shaft 6 may extend generally vertically and may be connected at its upper end or lower end to an actuator 9, preferably an electric or hydraulic actuator, configured to rotate the shaft 6, preferably through a gear assembly (not shown). A shaft base 5 is connected to an upper support gimbal (not shown) which in turn is pivotally secured at a fixed position to a portion of a rudder section, fuselage section or tail section (more generally, a reference structure) of the aircraft.

The trimmable horizontal stabiliser 7 may be pivotally connected by a pivot structure 15 which is fixed to the rudder section or fuselage tail section (not shown) of the aircraft. A forward end of the trimmable horizontal stabiliser 7 may be in turn pivotally connected to a drive gimbal (not shown) which in turn is pivotally connected to the primary nut 4.

In order to selectively set the position of the trimmable horizontal stabiliser 7, the pilot through operation of an internal control unit will control the actuator 9 to rotate the shaft 6 which will move the primary nut 4 along the shaft 6 to pivot the forward end of the trimmable horizontal stabiliser 7. The actuator 9 can be rotated in two opposite directions to either move the primary nut 4 up or down relative to the aircraft, and thereby the trimmable horizontal stabiliser 7 can be rotated to the desired position. As this occurs the assembly 3 may pivot at the fixed support gimbal and pivot at the movable drive gimbal to accommodate the angular, arcuate displacement of the forward end of the trimmable horizontal stabiliser 7.

Figure 2:
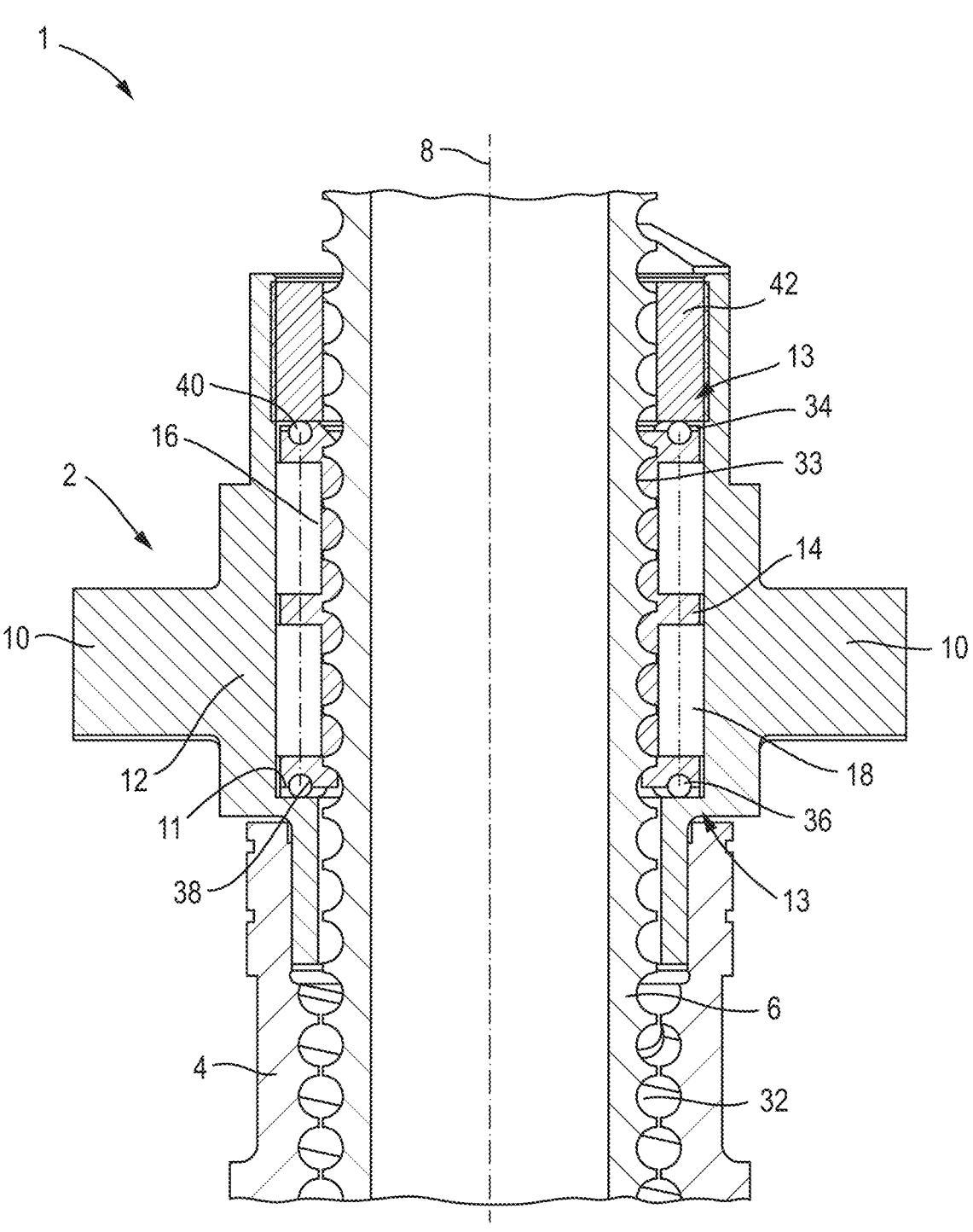
FIG. 2 shows a cross-sectional view of a secondary nut, a portion of a primary nut, and a portion of a shaft of an assembly for maintaining the pitch angle of a trimmable horizontal stabiliser according to the invention.

FIG. 2 shows a cross-sectional view of an assembly 1 for maintaining the pitch angle of a trimmable horizontal stabiliser according to the invention. The assembly 1 shown in FIG. 2 may form part of the assembly 3 for changing and maintaining the pitch angle of a trimmable horizontal stabiliser 7 shown in FIG. 1.

The assembly 1 includes a secondary nut 2, a primary nut 4 (a portion of which is shown), and a shaft 6 (again, a portion of which is shown). The cross-section is taken through a central or longitudinal axis 8 of the shaft 6.

As explained above, an actuator for a trimmable horizontal stabiliser is typically located in a fuselage or body of an aircraft, and in the tail section thereof. The actuator 9 may be an electric motor or a hydraulic actuator and is part of a mechanism for changing a pitch angle of the trimmable horizontal stabiliser. The description provided below assumes there is one trimmable horizontal stabiliser with two sides each extending laterally out of opposite sides of the fuselage, but it will be appreciated that the same assembly could be used to change the pitch angle of any flight control surface(s), for example any suitable number of (e.g., two) stabilisers.

The actuator 9 is configured to rotate the shaft 6, which may be disposed generally vertically. A shaft base comprising a non-rotating part of the actuator may be configured to be connected to the fuselage, for instance through a gimbal joint. A portion of the trimmable horizontal stabiliser 7 which extends through the fuselage (not shown) is connected to a nut of the assembly, for instance through a gimbal joint. In normal operation, the trimmable horizontal stabiliser is attached to a primary nut of the actuator, for instance through a gimbal joint, to provide a primary load path between the trimmable horizontal stabiliser and the mechanism. The trimmable horizontal stabiliser is also pivotably connected to the fuselage via a hinged connection. In such operation, the primary nut is engaged with the shaft 6, and the actuator is configured to rotate the shaft 6 which causes the primary nut to translate vertically along the shaft 6, thereby pivoting the trimmable horizontal stabiliser about the hinged connection to adjust the pitch angle of the trimmable horizontal stabiliser. In other embodiments, the shaft and actuator may be configured to move more than trimmable horizontal stabilisers, for example the shaft and actuator may be configured to rotate two horizontal trimmable actuators.

FIG. 2 illustrates the secondary nut 2 when it is engaged with the shaft 6. The secondary nut 2 is configured to engage with the shaft 6 in the event of failure of the primary nut using a locking mechanism, as described below. The secondary nut 2 includes trunnions 10 for connecting to a connection element, for example a strut, of the trimmable horizontal stabiliser such that the trimmable horizontal stabiliser can pivot relative to and translate with the nut. In other embodiments, the trimmable horizontal stabiliser may be connected directly to the nut and a strut may not be present.

The secondary nut 2 includes a housing 12 and a barrel 14 disposed in the housing. The barrel 14 has a series of circumferentially spaced slots 16 for receiving a plurality of locking elements 18 in the form of rollers. The housing 12 may be configured to be connected to the trimmable horizontal stabiliser. This connection may be provided by at least one trunnion of the housing 12. The connection between housing 12 and the trimmable horizontal stabiliser prevents the housing from rotating around the shaft 6.

Figure 3:
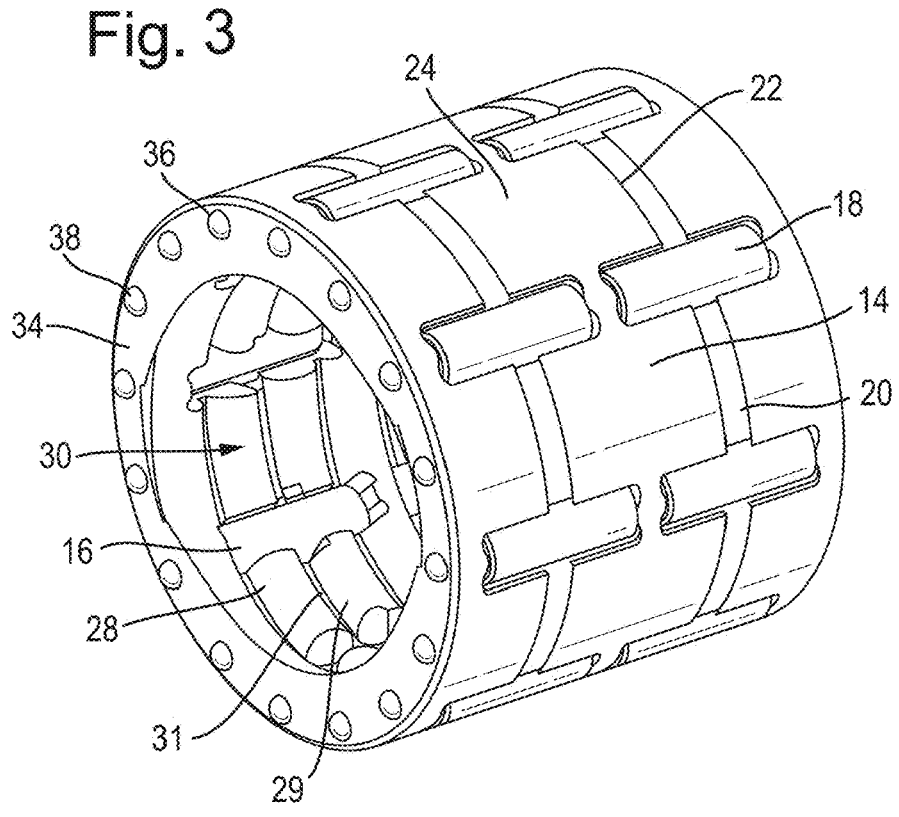
FIG. 3 shows a perspective view of a barrel and locking elements of the secondary nut shown in FIG. 2.

FIG. 3 shows a perspective view of the barrel 14 and the rollers 18. Each slot 16 extends through the whole thickness of the barrel 14 (the thickness defined in a radial direction). Each roller 18 is disposed within a respective slot 16 such that the roller 18 is able to rotate about its axis and translate radially relative to the barrel 14. Each roller 18 may be held in a respective slot 16 without being rigidly attached to the barrel 14, to allow the rollers 18 to rotate about their axis and translate radially relative to the barrel 14. In the embodiment shown, there are two axially spaced rows of rollers 18 and eight rollers 18 in each row. However, the precise number is not essential and in other embodiments there may be more or fewer rows of rollers, or numbers of rollers in each row. For example, there may be one single row of roller, or more than two rows of rollers.

Figure 5:
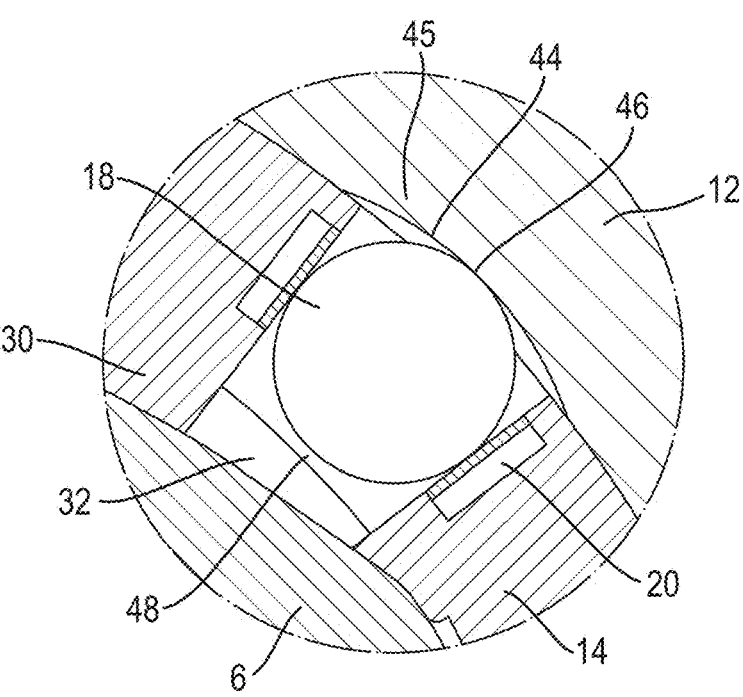
FIG. 5 shows a close-up cross-sectional view of a portion of the secondary nut and the shaft shown in FIG. 2, the secondary nut having a housing providing an indentation with a concave profile.
Figure 6:
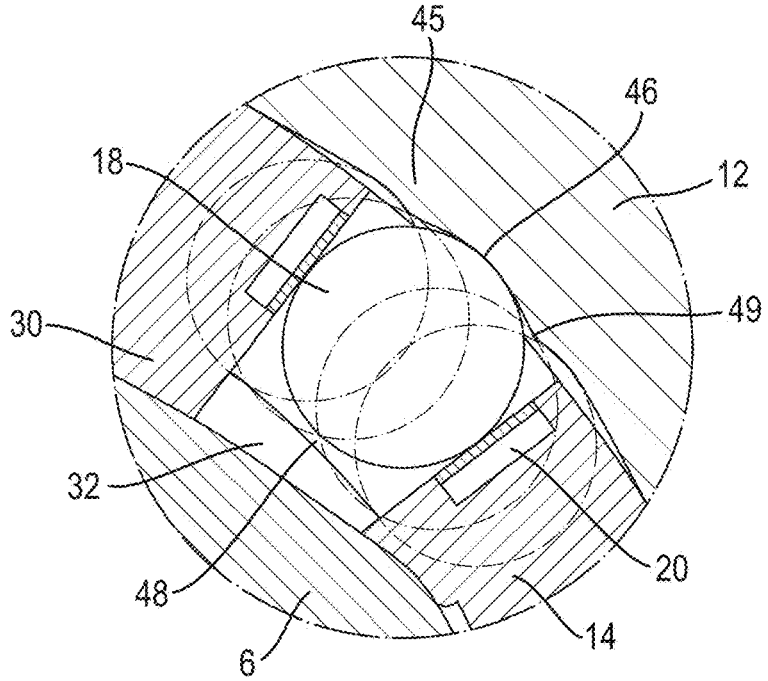
FIG. 6 shows a close-up cross-sectional view of a portion of another embodiment of the secondary nut and the shaft, the secondary nut providing an indentation with a wave-like profile.
Figure 7:
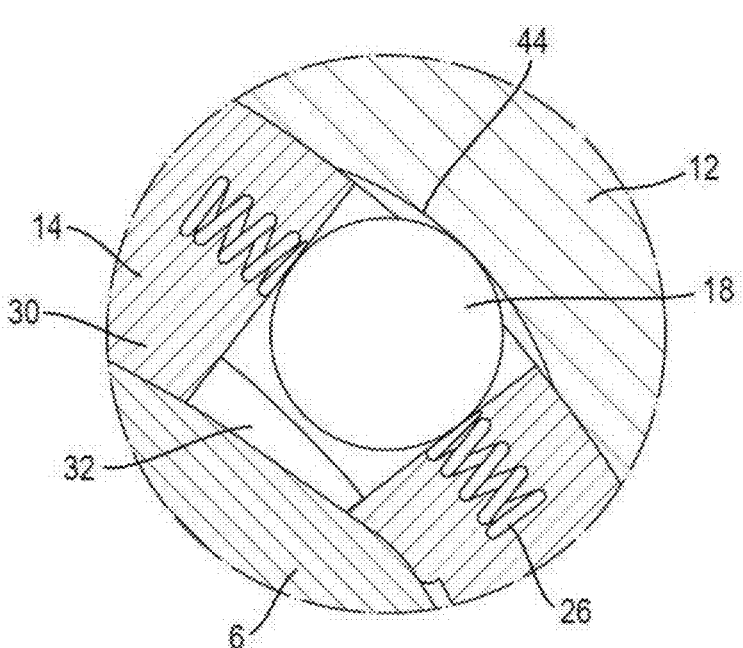
FIG. 7 shows a close-up cross-sectional view of a portion of another secondary nut with compression springs between the locking elements.

FIGS. 3 to 6 show a leaf spring 20 placed between consecutive rollers. Each leaf spring 20 may be held in a corresponding cavity 22 in an outer surface 24 of the barrel 14. The leaf springs 20 are configured to maintain the barrel in position in the housing through the rollers and to hold the rollers 18 radially in position. In this position there is a gap 48 between the rollers and the screw thread 32 of the shaft 6. This helps to keep the rollers 18 in their respective slots 16 in the barrel 14, to prevent contact between the rollers 18 and the shaft 6 in normal operation (i.e. non-failed primary load path), and to provide stability to the structure. The leaf springs 20 are not essential. For example, in other embodiments, as illustrated in FIG. 7, the rollers 18 may be held in place circumferentially using compression springs 26, or any other elastic element or preload device suitable for applying a load to the rollers in a radially outer direction of the barrel.

Another function of placing springs (for example leaf springs) between the rollers 18 is to hold the barrel 14 in position relative to the housing 16. This occurs because the springs act to push the rollers 18 radially outwards such that they contact the radially inner surface of the housing 16, thereby creating friction and preventing the barrel 14 from rotating in normal operation (i.e. outside of a locking step).

Although the springs are advantageous because they hold the rollers 18 securely in a radial position and aid in maintaining the gap 48, the springs are not essential and in other embodiments springs may not be present. In such embodiments, the rollers 18 may be held loosely in a respective slot 16.

FIG. 3 shows a radially inner surface 28 of the barrel 14, which includes a screw thread 30. The screw thread 30 of the barrel 14 is configured to engage with a screw thread 32 of the shaft 6. The screw thread 30 of the barrel 14 comprises raised portions 29 which collectively follow a helical path. The raised portions 29 are split at circumferential locations by the slots 16. A channel 31 which also follows a helical path is formed between the raised portions 29. The screw thread 32 of the shaft 6 and the screw thread 30 of the barrel 14 may each be in the form of an ACME thread.

As shown in FIGS. 2 and 3, the barrel 14 is disposed in a radially inner portion of the housing 12. Each axial end 34, 36 of the barrel 14 has a respective thrust bearing 13. In this embodiment, each thrust bearing 13 comprises a series of blind holes 38 on each axial end 34, 36 of the barrel 14 for receiving respective ball bearings 40. However, the thrust bearings may be of any suitable configuration, for example the thrust bearings may comprise tapered rollers instead of ball bearings, or the series of blind holes 38 may be replaced by a cylindrical slot for receiving the ball bearings. As shown in FIG. 2, the barrel 14 extends axially between an axial surface 11 of the housing 12 at one end, and a cap 42 at the other end to prevent the barrel 14 from moving in an axial direction. The cap 42 may be present to ensure that a seal is provided in the secondary nut 2 to prevent lubricant from escaping. The cap 42 is not essential, however, and in other embodiments the barrel 14 may be held in place axially by another surface of the housing 12, for example.

Figure 4:
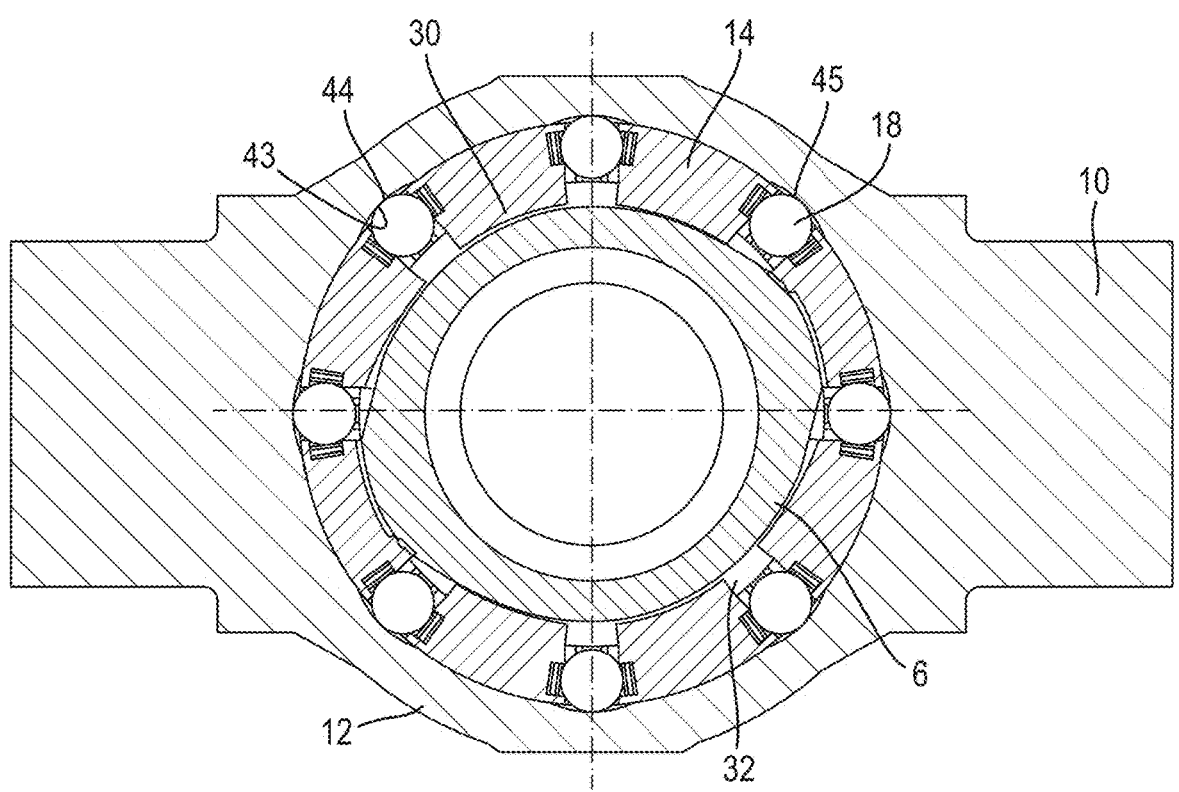
FIG. 4 shows a cross-sectional view of the secondary nut and the shaft shown in FIG. 2.

FIG. 4 illustrates a cross-sectional view of the secondary nut 2 and the shaft 6, the cross-section taken perpendicularly to the longitudinal axis 8 of the shaft 6, and FIG. 5 illustrates a close-up view of a portion of the secondary nut 2 and the shaft 6 (in the same cross-section).

As shown in FIGS. 4 to 7, a radially inner portion 45 of the housing 12 has a cam surface 43 comprising a plurality of indentations 44, each indentation 44 being adjacent to a respective roller 18. As shown in FIG. 5, when the secondary nut 2 is in a disengaged or unlocked position (i.e., during normal operation with the primary nut providing the load path), each roller 18 will be disposed in the deepest, and in this case a central portion 46 of an indentation 44. This means that there is a gap 48 between the roller and the screw thread 32 of the shaft 6.

In normal operation, therefore, when the primary load path/primary nut is functioning, the primary nut holds the secondary nut 2 in a position such that the screw thread 30 of the secondary nut 2 is not engaged with the screw thread 32 of the shaft 6. In this position, the screw thread 30 of the secondary nut 2 is spaced from the screw thread 32 of the shaft 6 so that the screw thread 30 of the secondary nut 2 is not in contact with the screw thread 32 of the shaft 6. The spacing may be possible, for example, due to the helical raised portion 29 of the screw thread 30 of the secondary nut 2 having a smaller axial width than a helical channel 33 of the screw thread 32 of the shaft 6 such that the helical raised portion 29 of the screw thread 30 can be held in the channel 33 with an axial gap either side of the raised portion 20. In such a position, the secondary nut 2 is in an unlocked position and the secondary nut 2 will translate axially during operation of the actuator due to its connection to the primary nut, without requiring the secondary nut 2 to be engaged with the screw thread 32 of the shaft 6. This avoids unnecessary wear of the secondary nut 2 during normal operation.

When the primary load path fails, the screw thread 32 of the shaft 6 is brought into engagement with the screw thread 30 of the barrel 14 of the secondary nut 2. Failure of the primary nut 4 may occur for a variety of reasons, for example due to failure of a trunnion of the primary nut 4, or due to failure of a bolt of the primary nut 4.

The assembly 1 is configured such that once the primary nut 4 fails, the primary nut 4 no longer holds the secondary nut 2 in a position such that the screw thread 30 of the secondary nut 2 is not engaged with the screw thread 32 of the shaft 6. This may occur, for example, due to a pin, for example a shear pin, connecting the primary nut 4 to the secondary nut 2 breaking once the primary nut 4 fails. Once the connection between the primary nut 4 and the secondary nut 2 has broken, the secondary nut 2 may shift axially such that the screw thread 30 of the secondary nut 2 engages with the screw thread 32 of the shaft 6. For example, an axially facing surface of the screw thread 30 of the secondary nut 2 may contact a corresponding axially facing surface of the screw thread 32 of the shaft 6.

Once the primary load path fails the screw thread 32 of the shaft 6 is brought into engagement with the screw thread 30 of the barrel 14. Because of this engagement, when the shaft 6 is rotated by the actuator, friction between the screw thread 32 of the shaft 6 and the screw thread 30 of the barrel 14 causes the barrel 14 to rotate relative to the housing 12 and the cap 42 (if present). The bearings 40 at the axial ends 34, 36 of the barrel 14 are configured to allow the barrel 14 to rotate relative to the housing 12 and the cap 42. The bearings 40 are not essential, for example there may be sliding contact between the barrel 14 and the housing 12 and the cap 42 instead of the bearings 40. For example, the sliding contact between the barrel 14 and the housing 12 and the cap 42 may be provided through anti friction rings (e.g. PTFE, ceramic), auto-lubricated rings or anti-friction coating applied on the barrel and/or housing interfacing surfaces.

As the barrel 14 rotates relative to the housing 12, each roller 18 travels circumferentially along the profile of its respective indentation 44 (see FIG. 5). The profile of the indentation 44 is shaped such that the roller 18 is forced radially inwards towards the screw thread 32 of the shaft 6 as the roller 18 moves circumferentially. This reduces the gap 48 between the roller and the screw thread 32 of the shaft 6, which will continue until the roller 18 is in contact with the screw thread 32 of the shaft 6.

In the locked position, the roller 18 is wedged between a radially inner surface of the housing 12 (at the periphery of the indentation 44) and the screw thread 32 of the shaft 6. This creates friction between the roller, the barrel 14 and the housing 12, and prevents the barrel 14 from rotating relative to the housing 12. As such the secondary nut 2 is in a locked position. In the locked position the barrel 14 is prevented from rotating relative to the housing 12. The housing 12 is prevented from rotating around the shaft 2 due to its connection to the trim horizontal stabiliser, both in primary and secondary load path conditions. In secondary load path conditions (when the primary load path has failed), the trimmable horizontal stabiliser is therefore prevented from rotating because the secondary nut 2 is in a locked position and prevented from translating along the shaft 6. This is because of the wedging of the rollers 18 between the screw thread 32 of the shaft 6 and the housing 12, preventing both rotation of the shaft 6 and translation of the secondary nut 2.

There may also be provided means for monitoring the apparatus and informing the pilot that the primary load path has failed and/or that the secondary load path is engaged. These means may detect that the primary load path has failed by detecting stalling of the motor. Once the failure of the primary load path is detected, the actuator can be instructed to maintain the torque applied by the motor. This can help the secondary nut 2 to move to a locked position. This feature can also be useful to reduce the risk of flutter because any free play between the secondary nut 2 and the shaft 6 can be cancelled by this feature.

The indentation 44 extends along the length of the roller in an axial direction. The indentation 44 is generally concave as illustrated in FIGS. 4 to 7.

More particular cross-sectional shapes may be provided in specific embodiments. For example, as illustrated in FIG. 6, the indentation 44 may have a wave-like cross section 49. In this arrangement, the cross section includes three concavities, with a crest defined between each one. In such an arrangement, the central concavity is deeper than the two adjacent concavities, so as to provide an overall indentation 44. The roller 18 may sit in the central concavity in normal operation. When the secondary nut 2 then moves to a locked configuration, the roller 18 may move past one of the crests into one of the shallower concavities. This particular shape is advantageous because the secondary nut 2 can remain locked when the torque applied by the actuator is released. This feature can also be useful to reduce the risk of flutter when operating through the secondary load path because any free play between the secondary nut 2 and the shaft 6 can be cancelled by this feature.

Locking elements 18 in the form of rollers (which are cylindrically shaped) are advantageous because they are able to roll easily in a circumferential direction whilst providing sufficient surface contact due to their length, thereby allowing them to withstand high loads. However, the use of cylindrical rollers is not essential and alternative locking elements may be provided that are configured in the same manner, such as spherical locking elements. In the case of spherical locking elements, the locking elements may be fitted in a plurality of radially extending circular openings formed in the barrel, which may be circumferentially arranged, or axially offset from each other. Another possibility is to fit a plurality of spherical locking elements in contact with each other in an elongated slot formed in the barrel, in a similar manner as the slots presented for the embodiment with rollers. Even though less optimum, non-rolling locking elements may also be considered, for instance pre-loaded pads, using otherwise the same principles as described above for the rollers or spherical locking elements.

The secondary nut 2 of the present invention provides a locking mechanism which is more reliable than known arrangements. This is at least in part because operation of the locking mechanism can be triggered by a rotation of the shaft only, and is therefore dependent on the torque applied by the actuator, rather than on axial forces applied by the horizontal stabiliser. The locking mechanism is particularly secure because the frictional force locking the secondary nut 2 in place increases as the torque applied by the actuator increases (even if the aerodynamic forces applied to the horizontal stabiliser are minimal). Furthermore, the locking mechanism is bi-directional in that it can operate in both directions of rotation of the shaft 6 and regardless of the axial load applied to the nut. The locking mechanism is also completely mechanical and is not dependent on any sensors or action by the pilot or computer system of the aircraft, further improving its reliability.

Although an arrangement with a trimmable horizontal stabiliser connected to a primary and secondary nut is described, the benefits of the above described secondary nut could equally be applied to an arrangement with a trimmable horizontal stabiliser which is connected to a shaft base comprising a non-rotating part of the shaft actuator, for instance through a gimbal joint, rather than to the primary and secondary nut. In such an arrangement, the primary and secondary nut is held stationary relative to the aircraft fuselage and when the actuator rotates the shaft, the shaft moves vertically relative to the primary and secondary nut. The trimmable horizontal stabiliser is attached to the shaft base and will move vertically relative to the primary and secondary nut when the shaft is rotated to change the pitch angle of the stabiliser. In such an arrangement, if the primary nut fails, the secondary nut will work in the same way as described above to engage with the shaft.

In yet another embodiment, the primary nut may be rotatably driven by the actuator, and the shaft configured to translate relative to the primary and secondary nuts upon rotation of the primary nut. In this case, either a nut base comprising a non-rotating part of the nut actuator is connected to the trimmable horizontal stabiliser and the shaft to the aircraft fuselage in a similar manner to the first presented arrangement, or the shaft is connected to the trimmable horizontal stabiliser and a nut base comprising a non-rotating part of the nut actuator is connected to a static component of the aircraft (for example the fuselage).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Although the present invention has been described with reference to preferred embodiments, it will be understood by those skilled in the art that various changes in form and detail may be made without departing from the scope of the invention as set forth in the accompanying claims.

The invention claimed is:

1. An assembly for maintaining the pitch angle of a flight control surface for an aircraft the assembly comprising:

a shaft comprising a screw thread and defining a shaft axis; and a nut comprising:

a housing;

a barrel located in the housing and comprising a screw thread for engaging with the screw thread of the shaft; and at least one locking element located in the housing; wherein:

the housing comprises a radially inner cam surface adjacent to the at least one locking element; and the barrel is configured to rotate relative to the housing when the screw thread of the barrel is engaged and rotating with the screw thread of the shaft so as to move the locking element along the cam surface from a disengaged position in which the locking element is spaced from the screw thread of the shaft, to an engaged position in which the locking element contacts the screw thread of the shaft and is wedged between the screw thread of the shaft and the housing thereby preventing relative rotation between the shaft and the housing.

2. The assembly according to claim 1, wherein the barrel comprises at least one radial opening, optionally at least one slot, and the at least one locking element is located in the at least one radial opening.

3. The assembly according to claim 1, wherein the slot is configured to allow the locking element to translate radially relative to the barrel from the disengaged to the engaged position.

4. The assembly according to claim 1, wherein the cam surface comprises an indentation formed in a radially inner surface of the housing adjacent to the locking element such that the locking element is forced radially inwards towards the screw thread of the shaft as the barrel rotates relative to the housing.

5. The assembly according to claim 4, wherein the indentation is formed by a concavity.

6. An assembly for maintaining the pitch angle of a flight control surface for an aircraft, preferably a trimmable horizontal stabiliser, the assembly comprising:

a shaft comprising a screw thread and defining a shaft axis; and a nut comprising:

a housing;

a barrel located in the housing and comprising a screw thread for engaging with the screw thread of the shaft; and at least one locking element located in the housing; wherein:

the housing comprises a radially inner cam surface adjacent to the at least one locking element; and the barrel is configured to rotate relative to the housing when the screw thread of the barrel is engaged and rotating with the screw thread of the shaft so as to move the locking element along the cam surface from a disengaged position in which the locking element is spaced from the screw thread of the shaft, to an engaged position in which the locking element is wedged between the screw thread of the shaft and the housing thereby preventing relative rotation between the shaft and the housing;

wherein the cam surface comprises an indentation formed in a radially inner surface of the housing adjacent to the locking element such that the locking element is forced radially inwards towards the screw thread of the shaft as the barrel rotates relative to the housing;

wherein the indentation comprises three concavities, a central of the concavities being deeper than two adjacent concavities.

7. The assembly according to claim 1, wherein the locking element is a roller.

8. The assembly according to claim 1, further comprising at least one biasing member configured to bias the locking element towards the cam surface.

9. The assembly according to claim 1, wherein the at least one locking element includes a plurality of locking elements distributed circumferentially about the barrel.

10. The assembly of claim 9, comprising two rows of locking elements.

11. An assembly for maintaining the pitch angle of a flight control surface for an aircraft, the assembly comprising:

a shaft comprising a screw thread and defining a shaft axis; and a nut comprising:

a housing;

a barrel located in the housing and comprising a screw thread for engaging with the screw thread of the shaft; and at least one locking element located in the housing; wherein:

the housing comprises a radially inner cam surface adjacent to the at least one locking element; and the barrel is configured to rotate relative to the housing when the screw thread of the barrel is engaged and rotating with the screw thread of the shaft so as to move the locking element along the cam surface from a disengaged position in which the locking element is spaced from the screw thread of the shaft, to an engaged position in which the locking element is wedged between the screw thread of the shaft and the housing thereby preventing relative rotation between the shaft and the housing;

wherein the at least one locking element includes a plurality of locking elements distributed circumferentially about the barrel;

at least one biasing member configured to bias the locking element towards the cam surface, wherein the at least one biasing member contacts consecutive locking elements.

12. The assembly of claim 11, the at least one biasing member comprising a leaf spring.

13. The assembly according to claim 1, comprising at least one bearing located axially between the barrel and the housing.

14. The assembly according to claim 1, wherein the cam surface is shaped such that the locking element can move from the disengaged to the engaged position with rotation of the barrel in two opposite directions of rotation.

15. An assembly for changing and maintaining the pitch angle of a flight control surface for an aircraft, the assembly comprising:

the assembly for maintaining the pitch angle of a flight control surface for an aircraft according to claim 1, wherein the nut is a secondary nut;

a primary nut engaged with the screw thread of the shaft; and an actuator configured to rotate the shaft or the primary nut such that the shaft and the primary nut translate relative to each other upon rotation of the actuator, and the secondary nut being configured to engage with the shaft of the assembly when the primary nut fails.

16. The assembly according to claim 1 wherein an axial end of the barrel comprising a series of blind holes, the at least one bearing is a spherical bearing, and each of the at least one bearings is provided in a respective blind hole.

* * * * *